United States Patent
Eroshkina et al.

(10) Patent No.: US 10,817,275 B2
(45) Date of Patent: Oct. 27, 2020

(54) AUTOMATED INTERNET OF THINGS BASED SOFTWARE PATCHING

(71) Applicant: EMC IP Holding Company LLC, Hopkinton, MA (US)

(72) Inventors: Elena G. Eroshkina, Ashland, MA (US); Aaron K. Spenard, Carver, MA (US); Srinivasa R. Maguluri, Shrewsbury, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 177 days.

(21) Appl. No.: 16/021,310

(22) Filed: Jun. 28, 2018

(65) Prior Publication Data
US 2020/0004523 A1    Jan. 2, 2020

(51) Int. Cl.
*G06F 8/65*      (2018.01)
*H04L 12/66*    (2006.01)
*H04L 29/08*    (2006.01)

(52) U.S. Cl.
CPC .............. *G06F 8/65* (2013.01); *H04L 12/66* (2013.01); *H04L 67/12* (2013.01); *H04L 67/34* (2013.01)

(58) Field of Classification Search
None
See application file for complete search history.

(56) References Cited

U.S. PATENT DOCUMENTS

| | | | |
|---|---|---|---|
| 9,971,595 B1 * | 5/2018 | Thompson | G06F 16/2365 |
| 10,452,375 B1 * | 10/2019 | Nightingale | H04L 67/34 |
| 2013/0232463 A1 * | 9/2013 | Nagaraja | G06F 8/61 |
| | | | 717/101 |

(Continued)

FOREIGN PATENT DOCUMENTS

KR    20180050001 A  *  5/2018

OTHER PUBLICATIONS

Jonghyup Lee, "Patch Transporter: Incentivized, Decentralized Software Patch System for WSN and IoT Environments," Sensors (Basel), Feb. 13, 2018, 35 pages, vol. 18, No. 2.

*Primary Examiner* — Insun Kang (74) *Attorney, Agent, or Firm* — Ryan, Mason & Lewis, LLP (57) ABSTRACT

An apparatus in one embodiment comprises a first processing platform configured to communicate over a network with at least one additional processing platform. The first processing platform further comprises a plurality of Internet of Things (IoT) sensors configured to detect application of software patches to a monitored system, and at least one IoT gateway coupled to the IoT sensors. The IoT gateway is configured to transmit over the network to the additional processing platform information characterizing one or more software patches previously applied to the monitored system, and to receive over the network from the additional processing platform information characterizing one or more additional software patches to be applied to the monitored system. The first processing platform is configured to apply the one or more additional software patches to the monitored system. The information characterizing the one or more additional software patches to be applied to the monitored system is automatically determined at least in part by an analytics engine.

20 Claims, 5 Drawing Sheets

(56) References Cited

U.S. PATENT DOCUMENTS

| | | | |
|---|---|---|---|
| 2016/0147506 A1* | 5/2016 | Britt | G06F 8/36 |
| | | | 717/107 |
| 2016/0364223 A1* | 12/2016 | Vandikas | H04W 4/50 |
| 2017/0010880 A1* | 1/2017 | Yamazaki | G06F 8/656 |
| 2017/0024290 A1* | 1/2017 | Kaulgud | G06F 11/00 |
| 2018/0060058 A1 | 3/2018 | Collins et al. | |
| 2018/0109650 A1* | 4/2018 | Berdy | H04L 67/2804 |
| 2018/0173502 A1* | 6/2018 | Biskup | G06F 8/30 |
| 2018/0295016 A1* | 10/2018 | Frahim | H04L 67/34 |
| 2018/0329763 A1* | 11/2018 | George | G06N 5/046 |
| 2018/0332117 A1* | 11/2018 | Street | G06N 5/046 |
| 2019/0042227 A1* | 2/2019 | Sharma | B64C 39/024 |
| 2019/0042228 A1* | 2/2019 | Nolan | G06F 8/64 |
| 2019/0095520 A1* | 3/2019 | Park | G06F 16/2358 |
| 2019/0149361 A1* | 5/2019 | Sarwar | H04L 67/34 |
| | | | 370/254 |
| 2019/0158600 A1* | 5/2019 | Cook | H04L 67/12 |
| 2019/0171442 A1* | 6/2019 | Machida | H04L 67/1031 |
| 2019/0173755 A1* | 6/2019 | Jadhav | H04L 67/125 |
| 2019/0215383 A1* | 7/2019 | Tellado | G06F 21/121 |
| 2019/0250898 A1* | 8/2019 | Yang | G06F 8/65 |
| 2019/0250899 A1* | 8/2019 | Riedl | G06F 8/65 |
| 2019/0265971 A1* | 8/2019 | Behzadi | H04L 67/12 |
| 2019/0294503 A1* | 9/2019 | Olinsky | G06F 11/1433 |
| 2019/0354367 A1* | 11/2019 | Rodriguez Bravo | H04L 63/20 |
| 2019/0391800 A1* | 12/2019 | Lin | H04L 67/34 |
| 2020/0012492 A1* | 1/2020 | Bonar | G06F 21/74 |

* cited by examiner

AUTOMATED INTERNET OF THINGS BASED SOFTWARE PATCHING

FIELD

The field relates generally to information processing systems, and more particularly to techniques for installing, updating, upgrading or otherwise patching software that is executed by processing devices in such systems.

BACKGROUND

It is often necessary to install, update, upgrade or otherwise patch software that is deployed for execution in various computers, servers, storage devices or other processing devices of an information processing system. In some systems, such software patching requires a significant amount of manual activity. For example, conventional maintenance patching of storage arrays and other types of storage systems often involves manually-driven processes that require precise coordination between multiple teams and may take multiple days to complete. These teams face challenges such as identifying all dependencies that will be affected by the maintenance patching as well as making sure that the maintenance patching will not lead to any conflicts between different instances of deployed software. Engineers may also need to manually check dozens of items to ensure that a given software update can be completed within a scheduled maintenance window. Various errors arising in these and other manual processes can lead to significant system down time.

SUMMARY

Illustrative embodiments utilize Internet of Things (IoT) sensors, gateways and other devices to provide automated IoT-based software patching in information processing systems. For example, some embodiments utilize applied software patch information gathered via IoT sensors associated with a storage array or other type of storage system and reported via an IoT gateway of a first processing platform to an additional processing platform comprising an analytics engine. The additional processing platform is configured to interact with the IoT gateway and possibly one or more other processing platforms of the information processing system in order to provide automated software patching of the storage array or other type of storage system based at least in part on results of analytics processing, and possibly using a combination of patch push and patch pull mechanisms, thereby avoiding the above-described problems associated with conventional software patching techniques.

In one embodiment, an apparatus comprises a first processing platform configured to communicate over a network with at least one additional processing platform. The first processing platform further comprises a plurality of IoT sensors configured to detect application of software patches to a monitored system, and at least one IoT gateway coupled to the IoT sensors. The IoT gateway is configured to transmit over the network to the additional processing platform information characterizing one or more software patches previously applied to the monitored system, and to receive over the network from the additional processing platform information characterizing one or more additional software patches to be applied to the monitored system. The first processing platform is configured to apply the one or more additional software patches to the monitored system.

The term "software patch" as used herein is intended to be broadly construed so as to encompass, for example, a software installation, a software update, a software upgrade, or other arrangement of software that may be applied to a given storage array, storage system or other monitored system in order to alter at least one characteristic of its configuration relative to its prior configuration.

The information characterizing the one or more additional software patches to be applied to the monitored system in illustrative embodiments is automatically determined at least in part by analytics processing performed by an analytics engine of the additional processing platform utilizing the information characterizing one or more software patches previously applied to the monitored system.

In some embodiments, the first processing platform comprises at least a portion of a data center and the monitored system comprises at least one storage array utilized by the data center. The monitored system may therefore be part of the first processing platform. Numerous other arrangements are possible.

At least a portion of the information characterizing one or more additional software patches to be applied to the monitored system illustratively comprises patch push information delivered from the additional processing platform to the first processing platform over the network via the IoT gateway.

Additionally or alternatively, at least a portion of the information characterizing one or more additional software patches to be applied to the monitored system illustratively comprises patch pull information delivered from the additional processing platform to the first processing platform over the network via the IoT gateway.

As another example, at least a portion of the information characterizing one or more software patches previously applied to the monitored system may comprise at least one list of multiple applied patches. Similarly, at least a portion of the information characterizing one or more additional software patches to be applied to the monitored system may comprise at least one list of multiple patches to be applied.

The IoT gateway in some embodiments is configured to utilize an authentication component to interface with an edge device authentication layer of the additional processing platform.

Application of the one or more additional software patches to the monitored system is controlled in some embodiments based at least in part on user input entered into a patch portal associated with the additional processing platform responsive to decision information provided to the user.

The first processing platform in some embodiments further comprises a patch staging module, a scheduling module, and a deployment engine having inputs coupled to respective outputs of the patch staging module and the scheduling module. The deployment engine has an output coupled to the monitored system and is configured to control application of the one or more additional software patches to the monitored system based at least in part on staging and scheduling information received from the respective patch staging and scheduling modules. For example, the deployment engine may be configured to utilize the staging and scheduling information received from the respective patch staging and scheduling modules to generate one or more patching runbooks that when executed in the first processing platform result in application of the one or more additional software patches to the monitored system.

In some embodiments, the information characterizing one or more software patches previously applied to the monitored system is transmitted to the additional processing platform for storage in a data lake of the additional processing platform. The data lake is accessible to an analytics engine that automatically determines the information characterizing the one or more additional software patches to be applied to the monitored system based at least in part on information stored in the data lake and software patches stored in a patch repository of the additional processing platform.

The information characterizing one or more additional software patches to be applied to the monitored system may be determined in some embodiments based at least in part on software patches stored in a patch repository of the additional processing platform. The stored software patches are illustratively received in the patch repository at least in part via a continuous integration continuous development (CICD) pipeline relating to software components of the monitored system.

These and other illustrative embodiments described herein include, without limitation, methods, apparatus, systems, and computer program products comprising processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1:
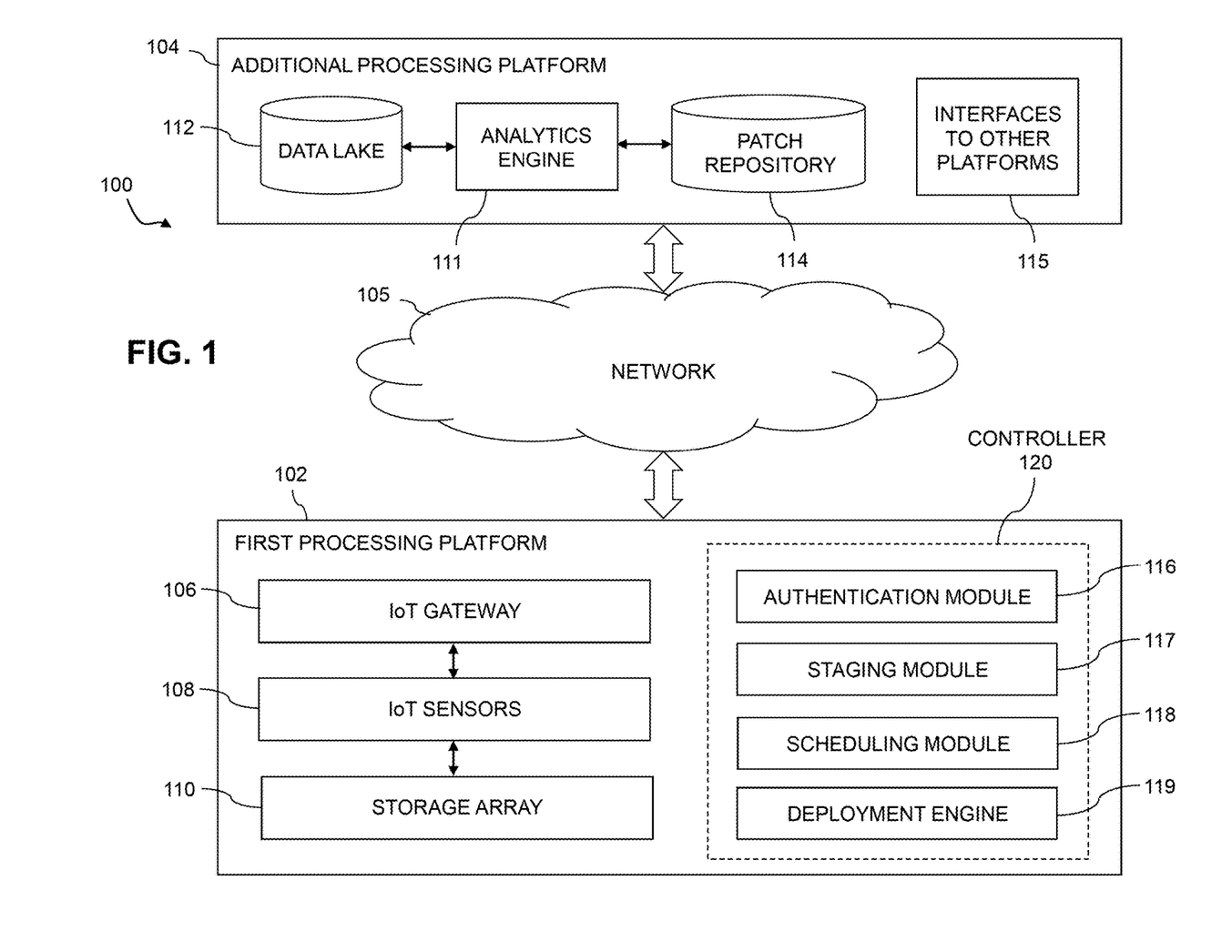
FIG. 1 is a block diagram of an information processing system configured with automated IoT-based software patching functionality in an illustrative embodiment.

FIG. 1 shows an information processing system 100 configured with automated IoT-based software patching functionality in accordance with an illustrative embodiment. The information processing system 100 comprises a first processing platform 102 configured to communicate with at least one additional processing platform 104 over a network 105.

The first processing platform comprises an IoT gateway 106, a plurality of IoT sensors 108 and a storage array 110.

The additional processing platform 104 comprises an analytics engine 111, a data lake 112 and a patch repository 114, as well as interfaces 115 to one or more other platforms, examples of which will be described below in conjunction with FIG. 3.

The first processing platform 102 further comprises a plurality of additional components 116, 117, 118 and 119 that collectively form at least a portion of a controller 120 of the first processing platform 102. The controller 120 in this embodiment more particularly comprises an authentication module 116, a staging module 117, a scheduling module 118 and a deployment engine 119.

Each of the processing platforms 102 and 104 is assumed to comprise a plurality of processing devices each having a processor coupled to a memory. One or more such processing devices may be implemented at least in part utilizing one or more virtual machines, containers or other types of virtualization infrastructure. Examples of processing platform implementations will be described below in conjunction with FIGS. 4 and 5.

At least one of the processing platforms 102 and 104 may more particularly comprise at least a portion of a cloud-based data center or other cloud-based computer system, although other types of processing platforms may be used in other embodiments. For example, in some embodiments, at least one of the processing platforms 102 and 104 may comprise an enterprise-based computer system rather than a cloud-based computer system.

A given cloud-based implementation of a particular one of the processing platforms 102 or 104 illustratively includes commercially-available cloud infrastructure, such as an allocated portion of an Amazon Web Services (AWS) system. Other examples of cloud-based systems that can be used to implement one or more processing platforms of system 100 include Google Cloud Platform (GCP) and Microsoft Azure.

A cloud-based system of this type illustratively comprises a Platform-as-a-Service (PaaS) layer overlying an Infrastructure-as-a-Service (IaaS) layer. The IaaS layer may comprise a plurality of virtual machines supporting application containers of the PaaS layer. For example, host devices in such an embodiment illustratively correspond to respective ones of the virtual machines of the IaaS layer.

The first and additional processing platforms 102 and 104 are each associated with a plurality of system users. The term "user" in this context and elsewhere herein is intended to be broadly construed so as to encompass, for example, human, hardware, software or firmware entities, as well as various combinations of such entities. At least some of the system users can be associated with various processing devices through which those users interface with various system components. These processing devices associated with system users can include, for example, desktop, laptop or tablet computers, mobile telephones, or other types and arrangements of devices that support user interfaces to functionality of system 100.

The network 105 may comprise any of a variety of different types of networks, including by way of example a global computer network such as the Internet, a wide area network (WAN), a local area network (LAN), a satellite network, a telephone or cable network, a cellular network, a wireless network such as a WiFi or WiMAX network, or various portions or combinations of these and other types of networks.

Although only a single IoT gateway 106 is shown in this embodiment, the first processing platform 102 may comprise additional IoT gateways, each possibly associated with a different set of IoT sensors 108. Also, the first processing platform 102 may comprise multiple instances of storage array 110. Other types of storage systems may be used in place of the storage array 110 in other embodiments.

The IoT sensors 108 in this embodiment are configured to detect application of software patches to the storage array 110. The storage array 110 in this embodiment is an example of what is more generally referred to herein as a "monitored system." A given such monitored system is monitored for activities relating to installing, updating, upgrading or otherwise patching software utilized by that monitored system. The monitoring is performed in an automated manner in the present embodiment utilizing the IoT sensors 108. Such IoT sensors 108 can include any of a wide variety of different IoT device types that can be incorporated into or otherwise associated with the storage array 110 for purposes of generating IoT data relating to application of software patches to the storage array 110. At least a portion of the IoT sensors 108 can be configured to send and receive machine-to-machine (M2M) communications in accordance with standardized M2M protocols.

The storage array 110 of the first processing platform 102 may comprise, for example, at least one VNX® or Symmetrix VMAX® storage array from Dell EMC of Hopkinton, Mass. Other types of storage arrays that may be used in illustrative embodiments include scale-out all-flash content addressable storage arrays such as XtremIO™ storage arrays, also from Dell EMC.

As noted above, a given "monitored system" as the term is broadly used herein is not limited to storage arrays, but can comprise other types of storage systems. For example, a storage system can comprise network-attached storage (NAS), storage area networks (SANs), direct-attached storage (DAS) and distributed DAS, as well as combinations of these and other storage types, including software-defined storage. Other examples of particular types of storage products that can be used in implementing storage systems in illustrative embodiments include all-flash and hybrid flash storage arrays such as Unity™, software-defined storage products such as ScaleIO™ and ViPR®, cloud storage products such as Elastic Cloud Storage (ECS), object-based storage products such as Atmos®, and scale-out NAS clusters comprising Isilon® platform nodes and associated accelerators, all from Dell EMC. Combinations of multiple ones of these and other storage products can also be used in implementing a given storage system in an illustrative embodiment.

In some embodiments, the first processing platform 102 comprises at least a portion of a data center and the storage array 110 comprises one of a plurality of storage arrays utilized by the data center. Although shown as part of the first processing platform 102 in the figure, the storage array 110 or other monitored system in other embodiments may be arranged at least in part externally to the first processing platform 102.

The IoT gateway 106 in this embodiment is coupled to the IoT sensors 108 and configured to transmit over the network 105 to the additional processing platform 104 information characterizing one or more software patches previously applied to the storage array 110, and to receive over the network 105 from the additional processing platform 104 information characterizing one or more additional software patches to be applied to the storage array 110. The first processing platform 102 is configured to apply the one or more additional software patches to the storage array 110. As noted above, the storage array 110 in other embodiments may be replaced or supplemented with other types of storage systems or more generally other types of monitored systems.

The information characterizing the one or more additional software patches to be applied to the storage array 110 by the first processing platform 102 is automatically determined at least in part by analytics processing performed by the analytics engine 111 of the additional processing platform 104 utilizing the information characterizing one or more software patches previously applied to the storage array 110.

The term "software patch" as used herein is intended to be broadly construed so as to encompass, for example, a software installation, a software update, a software upgrade, or other arrangement of software that may be applied to a given storage array, storage system or other monitored system in order to alter at least one characteristic of its configuration relative to its prior configuration.

At least a portion of the information characterizing one or more additional software patches to be applied to the storage array 110 comprises patch push information delivered from the additional processing platform 104 to the first processing platform 102 over the network 105 via the IoT gateway 106. Delivery of such patch push information is illustratively initiated by the additional processing platform 104 based at least in part on analytics processing performed by the analytics engine 111.

Additionally or alternatively, at least a portion of the information characterizing one or more additional software patches to be applied to the storage array 110 comprises patch pull information delivered from the additional processing platform 104 to the first processing platform 102 over the network 105 via the IoT gateway 106. Delivery of such patch pull information is illustratively initiated by the first processing platform 102 possibly utilizing one or more automated patch requests or other types of information by the first processing platform 102 to the additional processing platform 104.

Some embodiments therefore utilize a combination of patch push information and patch pull information to determine one or more additional software patches to be applied to the storage array 110.

At least a portion of the information characterizing one or more software patches previously applied to the storage array 110 illustratively comprises at least one list of multiple applied patches.

Similarly, at least a portion of the information characterizing one or more additional software patches to be applied to the storage array 110 illustratively comprises at least one list of multiple patches to be applied.

The IoT gateway 106 in some embodiments is configured to utilize at least a portion of the authentication module 116 to interface with an edge device authentication layer of the additional processing platform 104. The authentication module 116 in alternative embodiments can be implemented at least in part as an internal authentication component of the IoT gateway 106 rather than externally to the IoT gateway 106 as part of the controller 120 of first processing platform 102 as shown in the figure.

In some embodiments, application of the one or more additional software patches to the storage array 110 is controlled based at least in part on user input entered into a patch portal associated with the additional processing platform 104 responsive to decision information provided to the user.

The deployment engine 119 of the controller 120 in the first processing platform 102 is configured to control application of the one or more additional software patches to the storage array 110 based at least in part on staging and scheduling information received from the respective staging module 117 and scheduling module 118. For example, the deployment engine 119 is illustratively configured to utilize the staging and scheduling information received from the respective staging module 117 and scheduling module 118 to generate one or more patching runbooks that when executed in the first processing platform 102 result in application of the one or more additional software patches to the storage array 110.

In some embodiments, the information characterizing one or more software patches previously applied to the storage array 110 is transmitted to the additional processing platform 104 for storage in the data lake 112. The data lake 112 is accessible to the analytics engine 111 that automatically determines the information characterizing the one or more additional software patches to be applied to the storage array 110 based at least in part on information stored in the data lake 112 and software patches stored in the patch repository 114 of the additional processing platform 104.

The stored software patches are received in the patch repository 114 at least in part via a continuous integration continuous development (CICD) pipeline relating to software components of the storage array.

In one possible operating configuration of the system 100, the IoT sensors 108 detect information on software patches that have already been applied to the storage array 110 and pass that information to the IoT gateway 106 for collection, aggregation and pre-processing. Alternatively, at least portions of the collection, aggregation and pre-processing can be performed at least in part by the IoT sensors 108 themselves. The result of these operations is illustratively a list of applied patches. The IoT gateway 106 utilizes the authentication module 116 to securely send the list of applied patches to the additional processing platform 104 over the network 105 for storage in the data lake 112.

The analytics engine 111 of the additional processing platform 104 performs analytics processing using the list of applied patches and possibly other contents of the data lake 112, as well as additional patch information stored in the patch repository 114, to determine a list of additional patches to be applied to the storage array 110. The list of additional patches is securely sent back to the IoT gateway 106 over the network 105 via the authentication module 116. The list of additional patches is processed by the controller 120 utilizing staging module 117 and scheduling module 118 to build deployment runbooks that are executed by the deployment engine 119 to deploy the additional patches to the storage array 110.

A more detailed example of automated IoT-based software patching functionality of this type will be described below in conjunction with the illustrative embodiment of FIG. 3.

It is to be appreciated that components of one or both of the processing platforms 102 and 104 can be implemented within respective separate physical systems in some embodiments. A processing platform such as the first processing platform 102 or the additional processing platform 104 in the FIG. 1 embodiment can therefore be implemented as a combination of multiple distinct physical systems or as a single physical system. Accordingly, the particular arrangement of processing platforms 102 and 104 and their respective components as shown in FIG. 1 is presented by way of example only. In other embodiments, only subsets of these components, or additional or alternative sets of components, may be used, and such components may exhibit alternative functionality and configurations.

Illustrative embodiments can process additional or alternative information utilizing the processing platforms 102 and 104. For example, additional information that can be processed in system 100 includes information relating to environmental conditions and associated hardware failures.

The operation of the information processing system 100 will now be described in further detail with reference to the flow diagram of the illustrative embodiment of FIG. 2. This figure illustrates a process that includes steps 200 through 208, and is suitable for use in system 100 but is more generally applicable to other types of information processing systems in which first and additional processing platforms interact to implement automated IoT-based software patching. The steps of the flow diagram of FIG. 2 in some implementations are illustratively performed at least in part under the control of the controller 120 in the first processing platform 102 of system 100 with involvement of at least the analytics engine 111 and possibly other components of the additional processing platform 104.

In step 200, application of software patches to a storage array is detected using a plurality of IoT sensors of a first processing platform. For example, the IoT sensors may be integrated into the storage array and configured to detect software configuration information of the storage array. In some embodiments, at least some of the IoT sensors may be external to the storage array. Such external IoT sensors may be configured, for example, to monitor software patch related communications directed to or from the storage array. The term "IoT sensor" as broadly used herein is intended to encompass any internal or external IoT device that is configured to detect software patches that have been applied to a storage array and that is in communication with an IoT gateway.

In step 202, applied software patch information detected by the IoT sensors is aggregated for transmission by an IoT gateway of the first processing platform. The IoT gateway is therefore configured to process applied software patch information received from multiple IoT sensors. The multiple IoT sensors are configured to monitor the storage array in order to detect application of software patches to the storage array.

In step 204, information characterizing one or more software patches previously applied to the storage array is transmitted via the IoT gateway to an additional processing platform. The information characterizing one or more software patches previously applied to the storage array in some embodiments is transmitted to the additional processing platform for storage in a data lake of the additional processing platform. The data lake is accessible to an analytics engine of the additional processing platform.

In step 206, information characterizing one or more additional software patches to be applied to the storage array is received via the IoT gateway from the additional processing platform. The information characterizing the one or more additional software patches to be applied to the storage array in some embodiments is automatically determined at least in part by analytics processing performed by the analytics engine of the additional processing platform utilizing the information characterizing one or more software patches previously applied to the storage array. The analytics engine in performing its analytics processing can also make use of other types of information such as software patch information stored in a patch repository of the additional processing platform.

In step 208, the one or more additional software patches are applied to the storage array, illustratively utilizing a deployment engine of a controller of the first processing platform that receives staging and scheduling information from respective staging and scheduling modules of the controller. The process then returns to step 200 and is repeated for one or more additional iterations.

Figure 2:
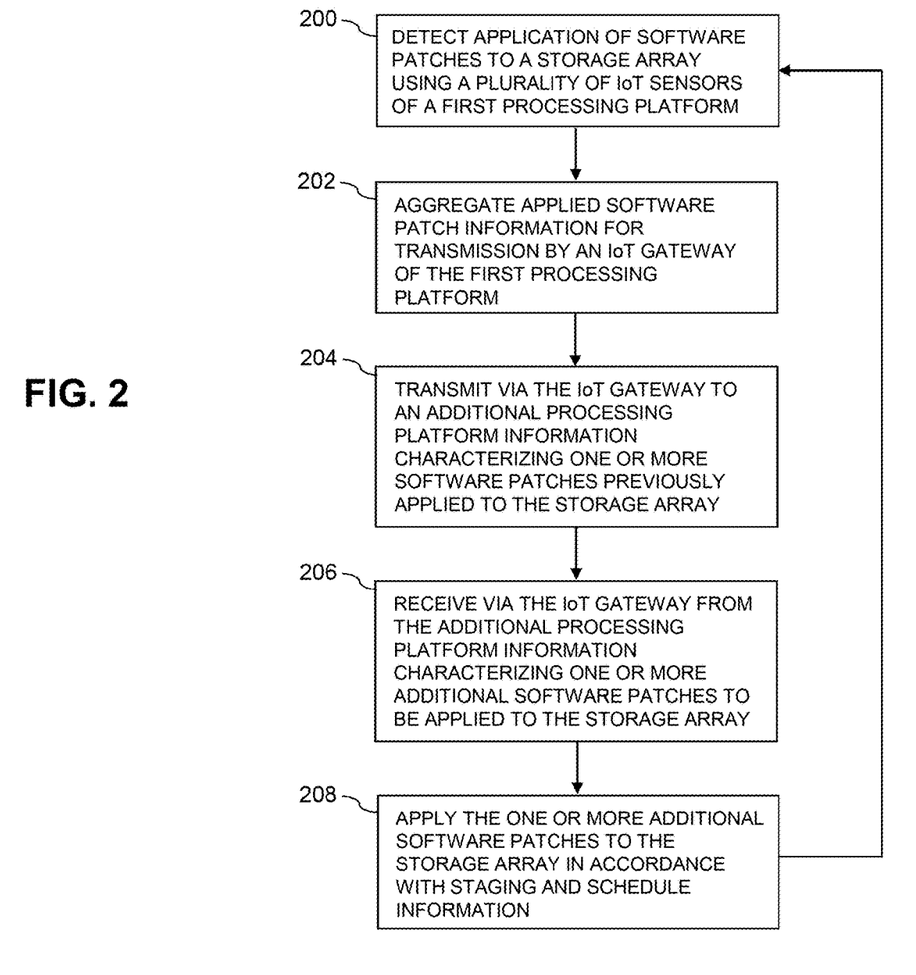
FIG. 2 is a flow diagram of a process for automated IoT-based software patching in an illustrative embodiment.

The particular processing operations and other system functionality described in conjunction with the flow diagram of FIG. 2 are presented by way of illustrative example only, and should not be construed as limiting the scope of the disclosure in any way. Alternative embodiments can use other types of processing operations for implementing automated IoT-based software patching. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different automated IoT-based software patching processes for respective different storage arrays, storage systems or other monitored systems within a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Figure 3:
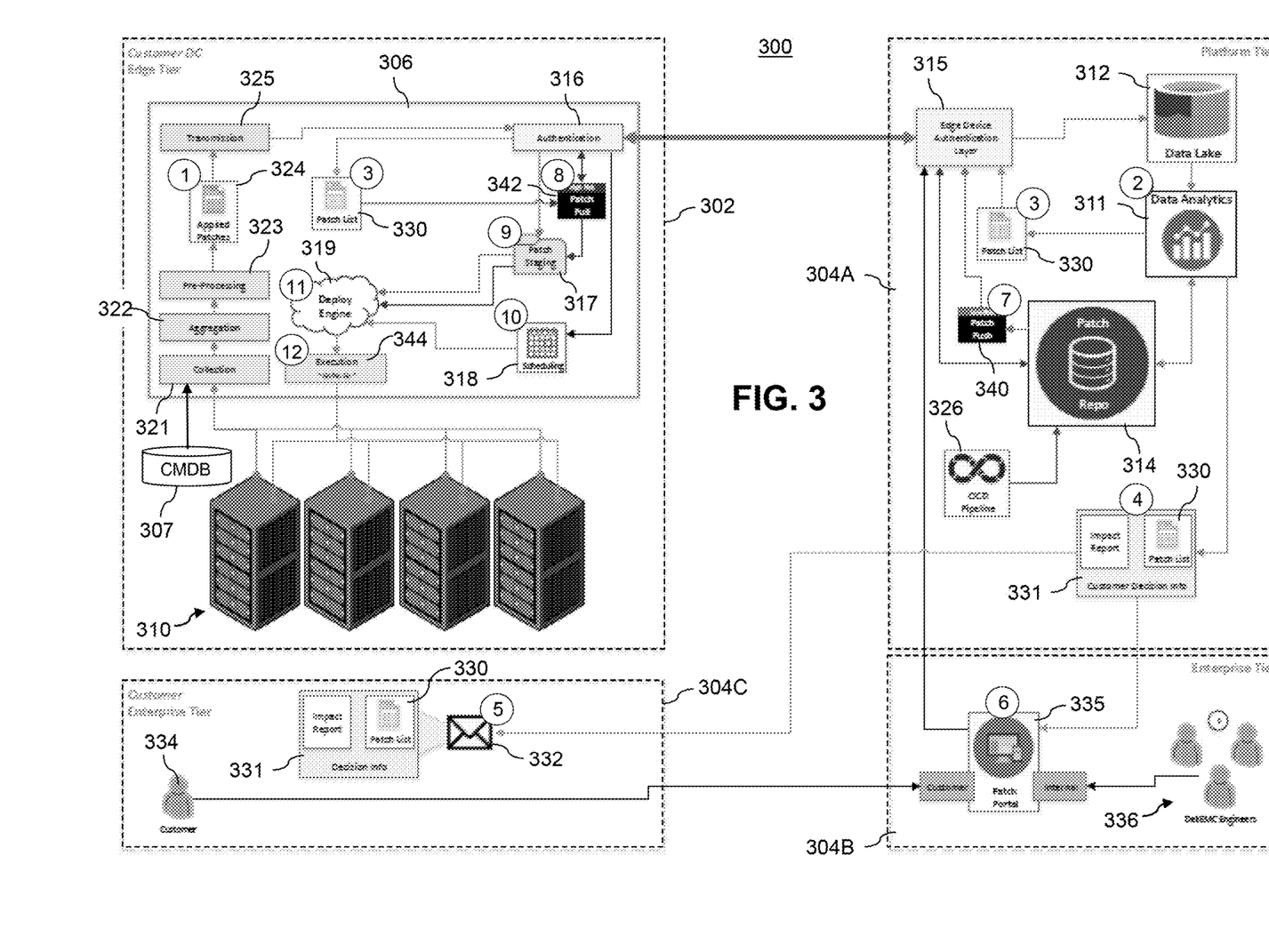
FIG. 3 is a combined block diagram and flow diagram showing an information processing system and its operation in implementing example automated IoT-based software patching functionality in another embodiment.

FIG. 3 shows another illustrative embodiment of an information processing system 300 with automated IoT-based software patching functionality. The information processing system 300 comprises a first processing platform 302 configured to communicate with a plurality of additional processing platforms 304A, 304B and 304C. The first processing platform 302 communicates with the additional processing platforms 304A, 304B and 304C over at least one network that is omitted from the figure for clarity and simplicity of illustration. The first processing platform 302 in this embodiment more particularly comprises a customer data center (DC) and is also referred to as an "edge tier" of the system 300. The first processing platform 302 may be viewed as analogous to the first processing platform 102 of the FIG. 1 embodiment, and similarly includes an IoT gateway 306 and a storage array 310.

The first processing platform 302 further comprises IoT sensors that are embedded within or otherwise associated with the storage array 310 and coupled to the IoT gateway 306, although such IoT sensors are not expressly shown in the figure.

Also coupled to the IoT gateway 306 in this embodiment is a configuration management database (CMDB) 307 that stores configuration information of the first processing platform 302. Examples of such configuration information include customer CMDB attribute data such as host, operating system, applications, network, SAN switches, etc. Additional or alternative data management systems may also be integrated with the automated IoT-based software patching functionality of the system 300.

The additional processing platform 304A is also referred to as a "platform tier" of the system 300, and comprises an analytics engine 311, a data lake 312, a patch repository 314 and an interface 315 to the first processing platform 302. It is configured in a manner similar to that described previously for the additional processing platform 104 of the FIG. 1 embodiment. The additional processing platform 304A also includes interfaces to the other additional processing platforms 304B and 304C.

The additional processing platforms 304B and 304C are also referred to as respective "enterprise tiers" of the system 300. The additional processing platform 304B is a customer enterprise tier associated with the customer data center of first processing platform 302. The "customer" in this embodiment is a service provider or other owner of the enterprise data center that purchases the storage array 310 from a vendor such as Dell EMC. The additional processing platform 304C is illustratively a vendor enterprise tier of a vendor such as Dell EMC that supplies the storage array 310 to the customer.

The first processing platform 302 in this embodiment further comprises an authentication module 316, a staging module 317, a scheduling module 318 and a deployment engine 319, all of which operate in a manner similar to that described previously for the corresponding components of the controller 120 in the FIG. 1 embodiment.

The system 300 is illustratively configured to perform automated analysis of an existing software configuration of the storage array 310 and to apply any needed software patches in an autonomous manner, utilizing machine learning based analytics processing performed by the analytics engine 311. For example, a linear regression model, a multi-regression model, or combinations of multiple regression models of different types can be used to provide machine learning functionality in the system 300.

FIG. 3 also illustrates an example automated IoT-based software patching process implemented in the system 300. The process includes steps 1 through 12, corresponding generally to the respective circled numerals in the figure. These steps are more particularly described as follows:

1. The IoT gateway 306 interacts with a plurality of IoT sensors of the storage array 310 in performing operations including collection 321, aggregation 322 and pre-processing 323 in order to generate a list of applied patches 324. The list of applied patches 324 is an example of what is more generally referred to herein as "information characterizing one or more software patches previously applied" to the storage array 310. In alternative embodiments, at least portions of the collection 321, aggregation 322 and pre-processing 323 may be implemented at least in part within one or more of the IoT sensors. The IoT gateway 306 in this embodiment also utilizes the configuration information from the CMDB 307 in performing at least the collection 321, and possibly other operations.

2. The IoT gateway 306 utilizes transmission module 325 and authentication module 316 to securely send the list of applied patches 324 via the data lake 312 to the analytics engine 311 of the additional processing platform 304A. The interface 315 between the first processing platform 302 and the additional processing platform 304A in this embodiment includes an edge device authentication layer through which the IoT gateway 306 establishes secure communication channels with the additional processing platform 304A. The analytics engine 311 utilizes information in the data lake 312 including the list of applied patches 324 to generate a to-be-applied patch list 330. The patch list 330 is an example of what is more generally referred to herein as "information characterizing one or more additional software patches to be applied" to the storage array 310. In generating the patch list 330, the analytics engine 311 also utilizes information stored in the patch repository 314, which is driven at least in part by a CICD pipeline 326.

3. The patch list 330 is securely sent back to the IoT gateway 306 via the interface 315 comprising the edge device authentication layer.

4. The patch list 330 and an associated impact report is sent as part of customer decision information 331 to the additional processing platform 304C. The impact report may contain a risk assessment as well as a proposed maintenance time and an order of patching.

5. An email message 332 directed to a customer 334 associated with the additional processing platform 304C includes the above-noted customer decision information 331 which comprises the patch list 330 and the associated impact report.

6. The customer decision information is also delivered to a patch portal 335 of the additional processing platform 304B. The patch portal 335 comprises a customer interface accessible to the customer 334 and an internal interface accessible to a plurality of engineers 336 who are experts on the storage array 310. It is assumed in this embodiment that the storage array 310 comprises a Dell EMC storage array of the type described previously herein and the engineers 336 are Dell EMC engineers. The patch portal 335 therefore includes both customer-facing and engineer-facing views. The customer 334 and the engineers 336 collaborate via the patch portal 335 to determine patch scheduling information that is sent back to the scheduling module 318 of the IoT gateway 306 via the interface 315 of the additional processing platform 304A.

7. At least a portion of the information characterizing one or more additional software patches to be applied to the storage array 310 comprises patch push information 340 delivered from the additional processing platform 304A to the first processing platform 302. The patch push information 340 is illustratively "low risk" or "low impact" software patch information, which in some cases may be pushed to the IoT gateway 306 for deployment as soon as possible in an unattended mode.

8. At least a portion of the information characterizing one or more additional software patches to be applied to the storage array 310 comprises patch pull information 342 delivered from the additional processing platform 304A to the first processing platform 302. The patch pull information 342 is illustratively "high risk" or "high impact" software patch information, which in some cases may be pulled by the IoT gateway 306 for staging and deployment at a set time with appropriate controls.

9. The patch push and patch pull information 340 and 342 and possibly other information relating to the patch list 330 and its deployment are provided to the staging module 317.

10. Patch scheduling information from the patch portal 335 is provided to the scheduling module 318.

11. The deployment engine 319 utilizes the patch staging information from the staging module 317 and the patch scheduling information from the scheduling module 318 to build one or more deployment runbooks.

12. The deployment engine 319 controls an execution module 344 to execute the one or more deployment runbooks in order to apply the patches of the patch list 330 to the storage array 310. The execution module 344 is illustratively configured to execute a "go/no go" decision with regard to patch application.

Additional or alternative process steps can be used in other embodiments. For example, the FIG. 3 process in other embodiments can be modified to include one or more additional steps to verify patch deployments. Such additional steps for verifying patch deployments can be similar to steps 1 through 6 described above.

It should be noted that the particular arrangements illustrated in FIGS. 1 through 3 are presented by way of illustrative example only, and should not be construed as limiting in any way. As noted above, the described functionality for automated IoT-based software patching can be implemented using additional or alternative components, and in other processing contexts. Accordingly, a wide variety of different automated IoT-based software patching arrangements can be used in other embodiments.

For example, in some embodiments the automated IoT-based software patching functionality as disclosed herein is implemented using a high-level data analytics process flow that includes an input phase, a validation phase, an initial analytics phase, an analytics output phase, a software staging phase, and a post-patch analytics phase, although other types and arrangements of phases can be used in other embodiments.

The input phase can collect existing data characterizing the monitored system of the first processing platform, such as model, configuration, code versions, etc. This can include gathering customer CMDB data relating to hosts, operating systems, network and SAN switches, applications, etc. as well as customer patching preferences such as predefined dates and times, risk aversion levels, etc.

The validation phase can perform operations relating to failure analysis or other types of customer environment health checks, as well as license compliance.

The initial analytics phase can determine information such as patch impact (e.g., low, medium, high), patch severity (e.g., critical, recommended, security, etc.), patch dependencies (e.g., other patches that must be applied first), success rate for determined patch list (e.g., as a %), and alignment with an existing compatibility matrix or support statement.

The analytics output phase can determine recommended target code(s), techniques for upgrading to target code (e.g., single jump vs. multi-jump), an optimal patch window (e.g., based on customer preferences and historical load, where historical load may comprise data from all patch installs across multiple customer locations of similar type/size/complexity), upgrade method (e.g., online non-disruptive upgrade (NDU), rollover upgrade, offline upgrade), and upgrade type (e.g., on-site assisted, remote monitored, unsupervised). These outputs can be provided to a customer/engineering patch portal with customer notification via automated email.

The software staging phase performs operations such as downloading software to an IoT gateway at customer site, and generating pre-upgrade scripts for a deployment engine. These operations can be based on customer preferences in addition to the analytics output.

The post-patch analytics phase can determine deployment engine metrics (e.g., pass/fail patch status, per-patch duration, complete environment upgrade duration, etc.), and historical load adjustments (e.g., based on additional customer post-patch process data).

Again, additional or alternative phases can be used in other embodiments.

The illustrative embodiments described above provide significant advantages over conventional arrangements.

For example, some embodiments utilize applied software patch information gathered via IoT sensors associated with a storage array or other type of storage system and reported via an IoT gateway of a first processing platform to an additional processing platform comprising an analytics engine. The additional processing platform is configured to interact with the IoT gateway and possibly one or more other processing platforms of the information processing system in order to provide automated software patching of the storage array or other type of storage system based at least in part on results of analytics processing, and possibly using a combination of patch push and patch pull mechanisms, thereby avoiding substantial problems associated with conventional software patching techniques.

The disclosed automated IoT-based software patching techniques are adaptable in a straightforward manner for implementation in a wide variety of different use cases involving different storage arrays, storage systems or other types of monitored systems.

Moreover, illustrative embodiments can provide significant advantages to both customers and vendors of storage arrays, storage systems or other monitored systems. For example, some embodiments utilize IoT sensors and IoT gateways to provide edge-collected information on applied software patches that considerably facilitates performance of automated analytics and decreases the cost and complexity of performing an install, update, upgrade or other software patching operation.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement at least portions of automated IoT-based software patching functionality as disclosed herein will now be described in greater detail with reference to FIGS. 4 and 5. Although described in the context of system 100, these platforms may also be used to implement at least portions of other information processing systems in other embodiments.

Figure 4:
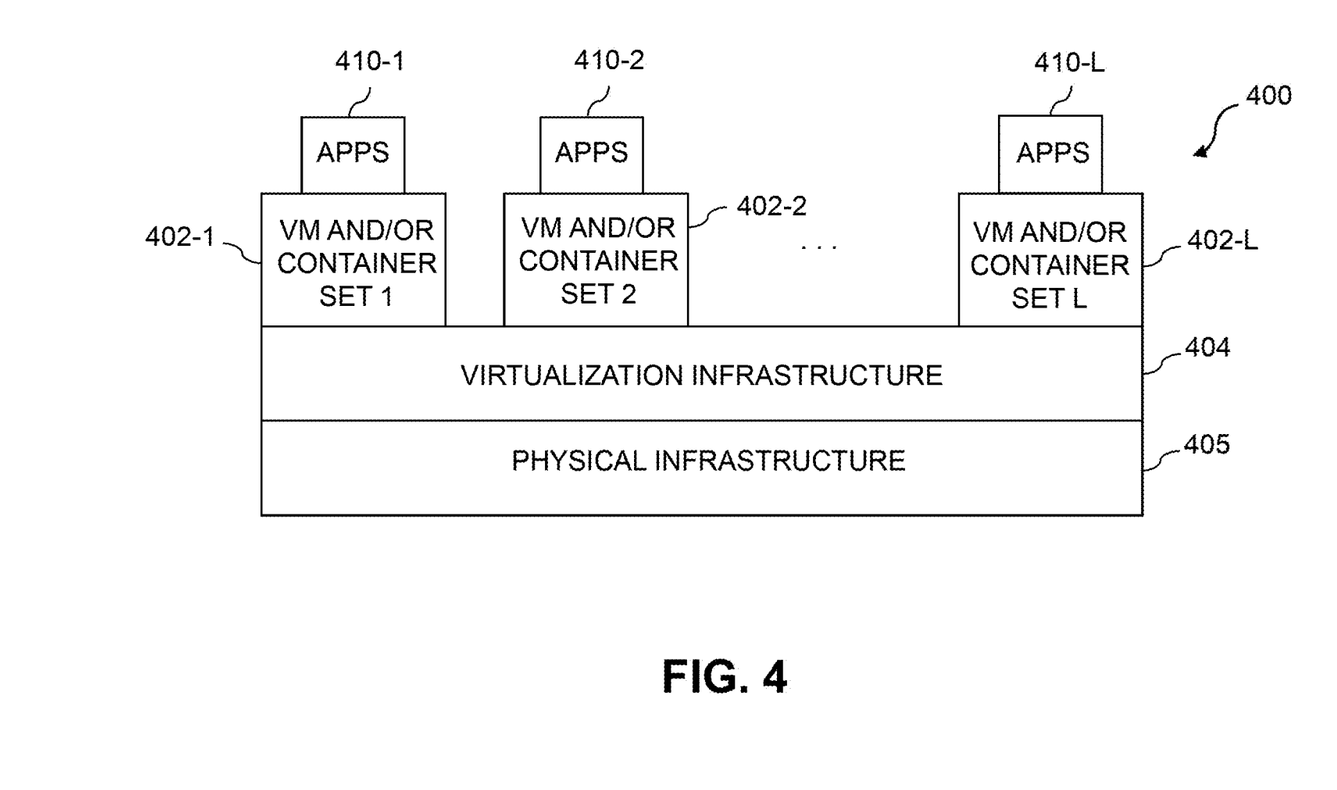
FIGS. 4 and 5 show examples of processing platforms that may be utilized to implement at least a portion of an information processing system in illustrative embodiments.
Figure 5:
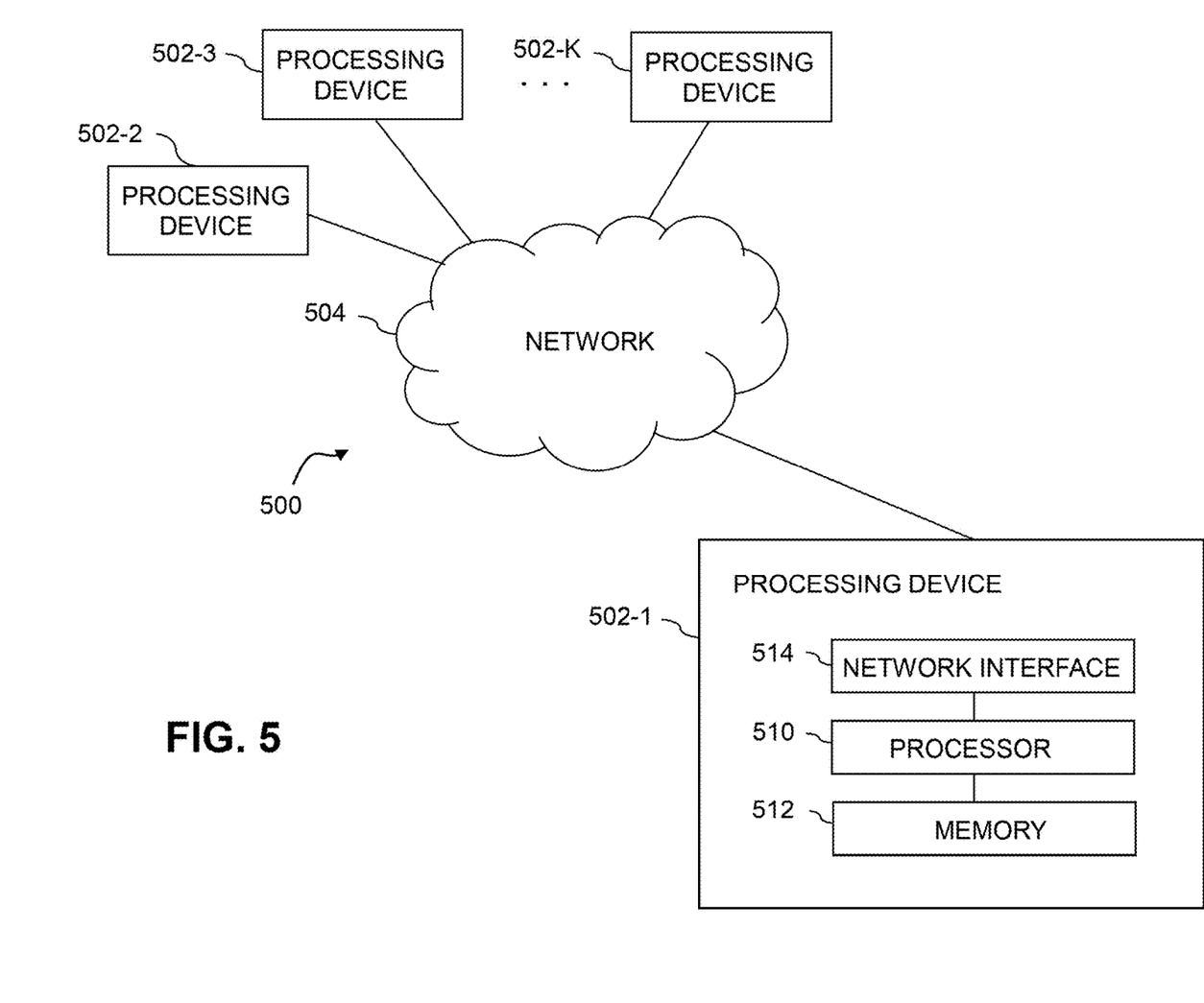

FIG. 4 shows an example processing platform comprising cloud infrastructure 400. The cloud infrastructure 400 comprises a combination of physical and virtual processing resources that may be utilized to implement at least a portion of the information processing system 100. The cloud infrastructure 400 comprises multiple virtual machines (VMs) and/or container sets 402-1, 402-2, . . . 402-L implemented using virtualization infrastructure 404. The virtualization infrastructure 404 runs on physical infrastructure 405, and illustratively comprises one or more hypervisors and/or operating system level virtualization infrastructure. The operating system level virtualization infrastructure illustratively comprises kernel control groups of a Linux operating system or other type of operating system.

The cloud infrastructure 400 further comprises sets of applications 410-1, 410-2, . . . 410-L running on respective ones of the VMs/container sets 402-1, 402-2, . . . 402-L under the control of the virtualization infrastructure 404. The VMs/container sets 402 may comprise respective VMs, respective sets of one or more containers, or respective sets of one or more containers running in VMs.

In some implementations of the FIG. 4 embodiment, the VMs/container sets 402 comprise respective VMs implemented using virtualization infrastructure 404 that comprises at least one hypervisor. Such implementations can provide automated IoT-based software patching functionality of the type described above at least in part utilizing processes running on the VMs. For example, different ones of the VMs can implement different portions of the controller 120 of the first processing platform 102 in the system 100.

An example of a hypervisor platform that may be used to implement a hypervisor within the virtualization infrastructure 404 is the VMware® vSphere® which may have an associated virtual infrastructure management system such as the VMware® vCenter™. The underlying physical machines may comprise one or more distributed processing platforms that include one or more storage systems.

In other implementations of the FIG. 4 embodiment, the VMs/container sets 402 comprise respective containers implemented using virtualization infrastructure 404 that provides operating system level virtualization functionality, such as support for Docker containers running on bare metal hosts, or Docker containers running on VMs. The containers are illustratively implemented using respective kernel control groups of the operating system. Such implementations can provide automated IoT-based software patching functionality of the type described above at least in part utilizing processes running on the containers. For example, a container host device supporting multiple containers of one or more container sets can implement different portions of the controller 120 of the first processing platform 102 in the system 100.

As is apparent from the above, one or more of the processing modules or other components of system 100 may each run on a computer, server, storage device or other processing platform element. A given such element may be viewed as an example of what is more generally referred to herein as a "processing device." The cloud infrastructure 400 shown in FIG. 4 may represent at least a portion of one processing platform. Another example of such a processing platform is processing platform 500 shown in FIG. 5.

The processing platform 500 in this embodiment comprises a portion of system 100 and includes a plurality of processing devices, denoted 502-1, 502-2, 502-3, . . . 502-K, which communicate with one another over a network 504.

The network 504 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 502-1 in the processing platform 500 comprises a processor 510 coupled to a memory 512.

The processor 510 may comprise a microprocessor, a microcontroller, an application-specific integrated circuit (ASIC), a field-programmable gate array (FPGA) or other type of processing circuitry, as well as portions or combinations of such circuitry elements.

The memory 512 may comprise random access memory (RAM), read-only memory (ROM), flash memory or other types of memory, in any combination. The memory 512 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 502-1 is network interface circuitry 514, which is used to interface the processing device with the network 504 and other system components, and may comprise conventional transceivers.

The other processing devices 502 of the processing platform 500 are assumed to be configured in a manner similar to that shown for processing device 502-1 in the figure.

Again, the particular processing platform 500 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™ or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of an information processing system providing automated IoT-based software patching functionality as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems comprising different arrangements of processing platforms, networks, IoT sensors, IoT gateways, storage systems and controllers. Also, the particular configurations of system and device elements and associated automated IoT-based software patching processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
a first processing platform comprising one or more processing devices each comprising a processor coupled to a memory;
the first processing platform being configured to communicate over a network with at least one additional processing platform;
the first processing platform further comprising:
a plurality of Internet of Things (IoT) sensors configured to detect application of software patches to a monitored system; and
at least one IoT gateway coupled to the IoT sensors and configured:
to transmit over the network to the additional processing platform information characterizing one or more software patches previously applied to the monitored system; and
to receive over the network from the additional processing platform information characterizing one or more additional software patches to be applied to the monitored system;
wherein the first processing platform is configured to apply the one or more additional software patches to the monitored system;
wherein the monitored system is separate from the at least one IoT gateway and the IoT sensors;
wherein the information characterizing the one or more additional software patches to be applied to the monitored system is automatically determined at least in part by analytics processing performed by an analytics engine of the additional processing platform utilizing the information characterizing one or more software patches previously applied to the monitored system and information characterizing software patches stored in a patch repository of the additional processing platform; and
wherein the first processing platform is further configured to generate, from the information characterizing the one or more additional software patches to be applied to the monitored system, one or more patching routines that when executed in the first processing platform result in application of the one or more additional software patches to the monitored system.

2. The apparatus of claim 1 wherein the first processing platform comprises at least a portion of a data center and the monitored system comprises at least one storage array utilized by the data center.

3. The apparatus of claim 1 wherein the monitored system is part of the first processing platform.

4. The apparatus of claim 1 wherein at least a portion of the information characterizing one or more additional software patches to be applied to the monitored system comprises patch push information delivered from the additional processing platform to the first processing platform over the network via the IoT gateway.

5. The apparatus of claim 1 wherein at least a portion of the information characterizing one or more additional software patches to be applied to the monitored system comprises patch pull information delivered from the additional processing platform to the first processing platform over the network via the IoT gateway.

6. The apparatus of claim 1 wherein at least a portion of the information characterizing one or more software patches previously applied to the monitored system comprises at least one list of multiple applied patches.

7. The apparatus of claim 1 wherein at least a portion of the information characterizing one or more additional software patches to be applied to the monitored system comprises at least one list of multiple patches to be applied.

8. The apparatus of claim 1 wherein the IoT gateway is configured to utilize an authentication component to interface with an edge device authentication layer of the additional processing platform.

9. The apparatus of claim 1 wherein application of the one or more additional software patches to the monitored system is controlled based at least in part on user input entered into a patch portal associated with the additional processing platform responsive to decision information provided to the user.

10. The apparatus of claim 1 wherein the first processing platform further comprises:
a patch staging module;
a scheduling module; and a deployment engine having inputs coupled to respective outputs of the patch staging module and the scheduling module;

the deployment engine having an output coupled to the monitored system and being configured to control application of the one or more additional software patches to the monitored system based at least in part on staging and scheduling information received from the respective patch staging and scheduling modules.

11. The apparatus of claim 10 wherein the deployment engine is configured to utilize the staging and scheduling information received from the respective patch staging and scheduling modules to generate the one or more patching routines as one or more patching runbooks that when executed in the first processing platform result in application of the one or more additional software patches to the monitored system.

12. The apparatus of claim 1 wherein the analytics engine automatically determines the information characterizing the one or more additional software patches to be applied to the monitored system based at least in part on information stored in a data lake of the additional processing platform.

13. The apparatus of claim 1 wherein the stored software patches are received in the patch repository at least in part via a continuous integration continuous development (CICD) pipeline relating to software components of the monitored system.

14. A method comprising:
configuring a first processing platform to communicate over a network with at least one additional processing platform;
wherein the first processing platform performs steps of:
detecting, in a plurality of Internet of Things (IoT) sensors coupled to an IoT gateway, application of software patches to a monitored system;
transmitting over the network via the IoT gateway to the additional processing platform information characterizing one or more software patches previously applied to the monitored system;
receiving over the network via the IoT gateway from the additional processing platform information characterizing one or more additional software patches to be applied to the monitored system; and
applying the one or more additional software patches to the monitored system;
wherein the monitored system is separate from the at least one IoT gateway and the IoT sensors;
wherein the information characterizing the one or more additional software patches to be applied to the monitored system is automatically determined at least in part by analytics processing performed by an analytics engine of the additional processing platform utilizing the information characterizing one or more software patches previously applied to the monitored system and information characterizing software patches stored in a patch repository of the additional processing platform;
wherein the first processing platform is further configured to generate, from the information characterizing the one or more additional software patches to be applied to the monitored system, one or more patching routines that when executed in the first processing platform result in application of the one or more additional software patches to the monitored system; and
wherein the first processing platform comprises one or more processing devices each comprising a processor coupled to a memory.

15. The method of claim 14 wherein the analytics engine automatically determines the information characterizing the one or more additional software patches to be applied to the monitored system based at least in part on information stored in a data lake of the additional processing platform.

16. A computer program product comprising a non-transitory processor-readable storage medium having stored therein program code of one or more software programs, wherein the program code when executed by a first processing platform, the processing platform being configured to communicate over a network with at least one additional processing platform, causes the first processing platform:
to detect, in a plurality of Internet of Things (IoT) sensors coupled to an IoT gateway, application of software patches to a monitored system;
to transmit over the network via the IoT gateway to the additional processing platform information characterizing one or more software patches previously applied to the monitored system;
to receive over the network via the IoT gateway from the additional processing platform information characterizing one or more additional software patches to be applied to the monitored system; and
to apply the one or more additional software patches to the monitored system;
wherein the monitored system is separate from the at least one IoT gateway and the IoT sensors;
wherein the information characterizing the one or more additional software patches to be applied to the monitored system is automatically determined at least in part by analytics processing performed by an analytics engine of the additional processing platform utilizing the information characterizing one or more software patches previously applied to the monitored system and information characterizing software patches stored in a patch repository of the additional processing platform; and
wherein the first processing platform is further configured to generate, from the information characterizing the one or more additional software patches to be applied to the monitored system, one or more patching routines that when executed in the first processing platform result in application of the one or more additional software patches to the monitored system.

17. The computer program product of claim 16 wherein the analytics engine automatically determines the information characterizing the one or more additional software patches to be applied to the monitored system based at least in part on information stored in a data lake of the additional processing platform.

18. The computer program product of claim 16 wherein at least a portion of the information characterizing one or more additional software patches to be applied to the monitored system comprises patch push information delivered from the additional processing platform to the first processing platform over the network via the IoT gateway.

19. The computer program product of claim 16 wherein at least a portion of the information characterizing one or more additional software patches to be applied to the monitored system comprises patch pull information delivered from the additional processing platform to the first processing platform over the network via the IoT gateway.

20. The computer program product of claim 16 wherein at least a portion of the information characterizing one or more software patches previously applied to the monitored system comprises at least one list of multiple applied patches.

\* \* \* \* \*